Feb. 21, 1939.   P. H. DIXON   2,147,735
FOLDING MACHINE
Filed Oct. 15, 1936   7 Sheets-Sheet 5
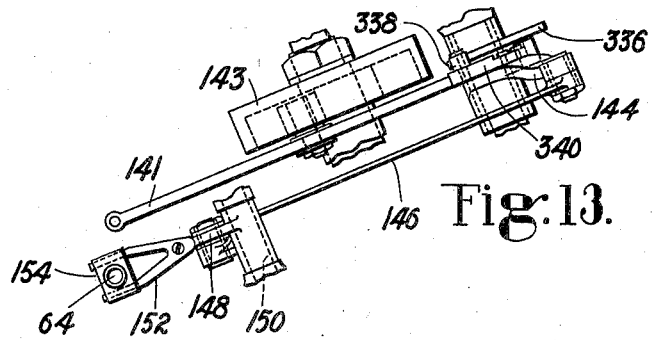
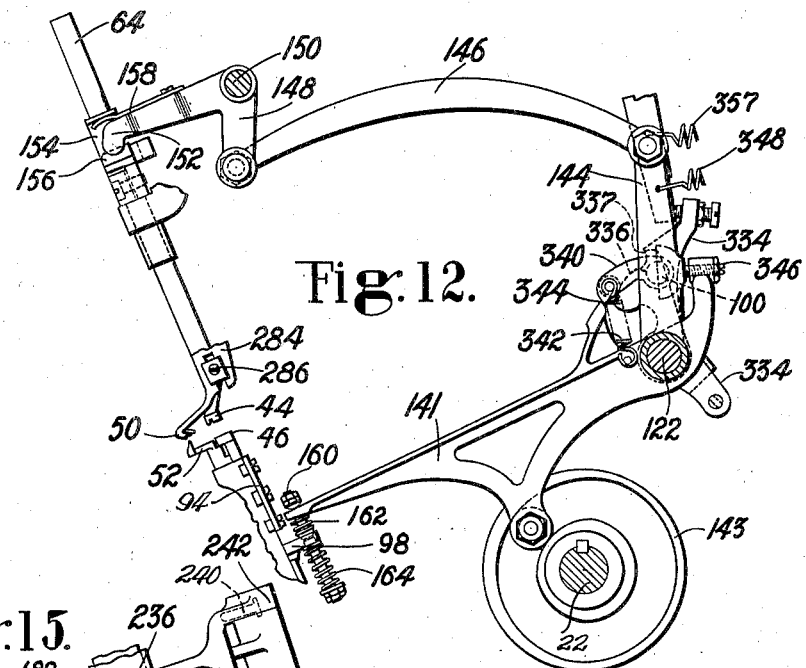
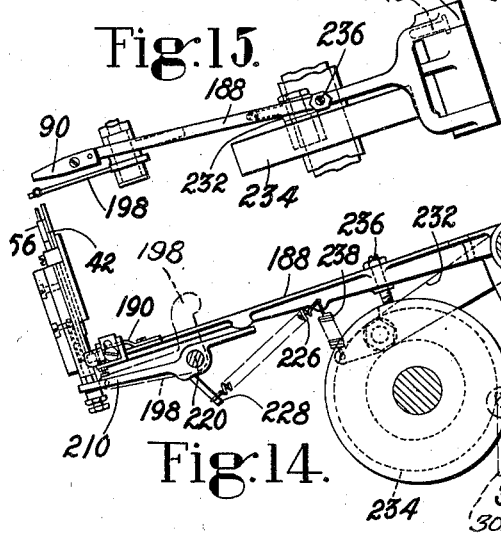

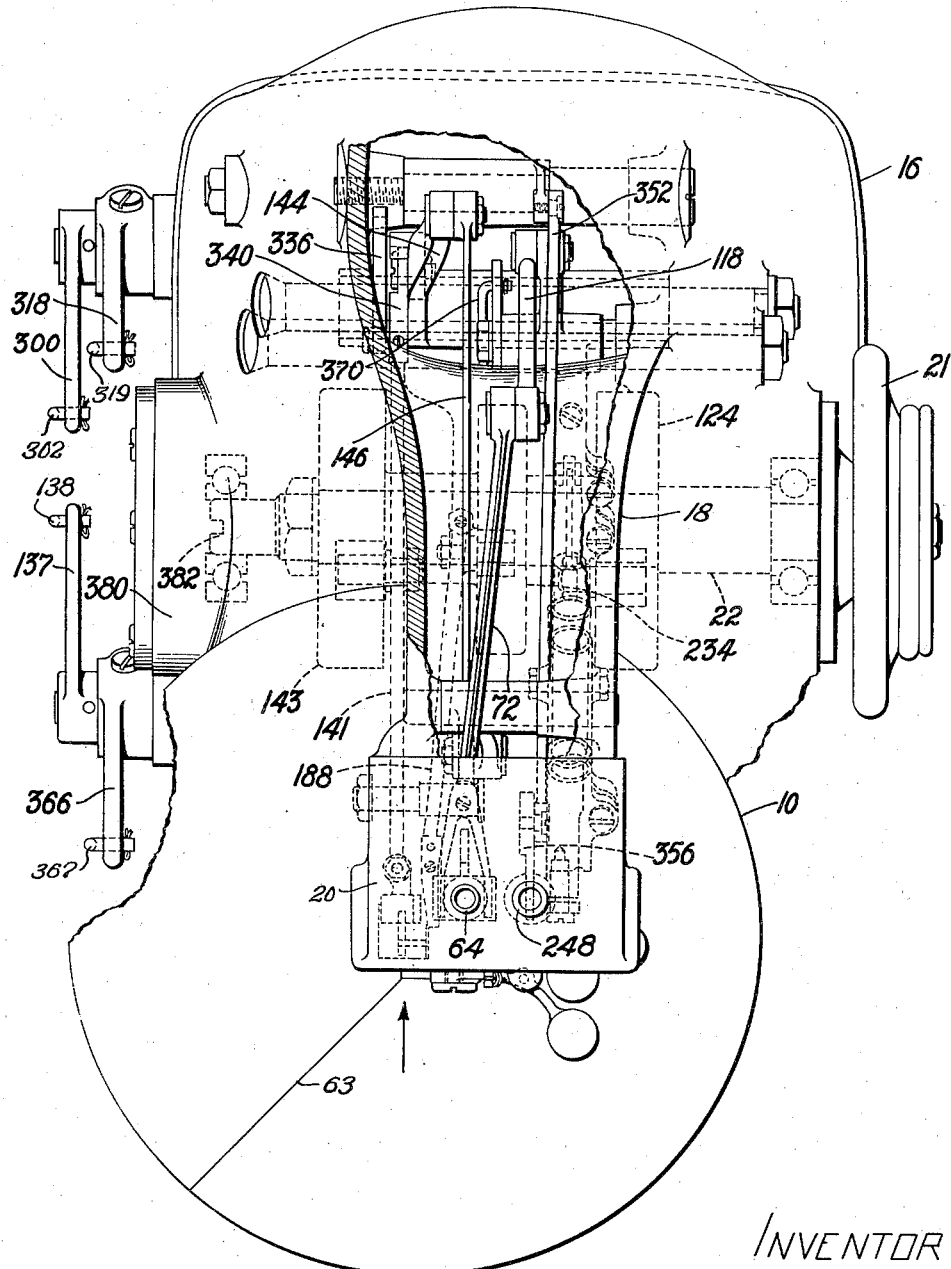

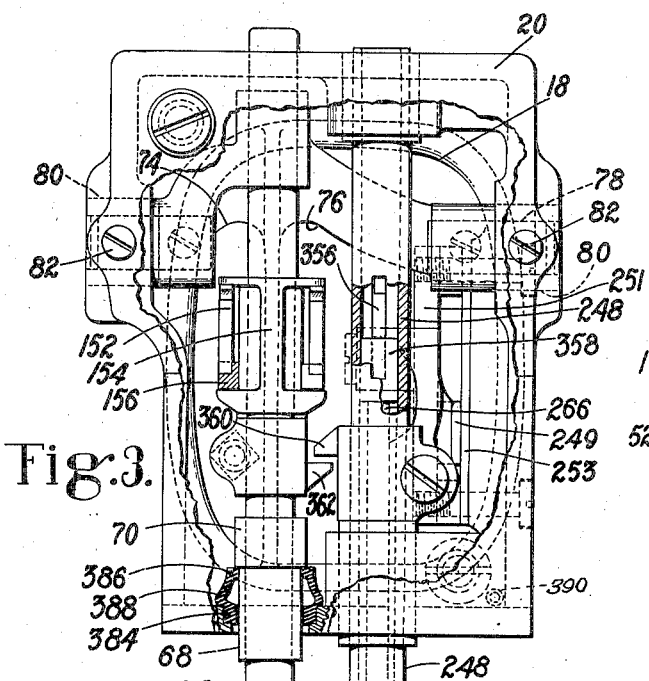
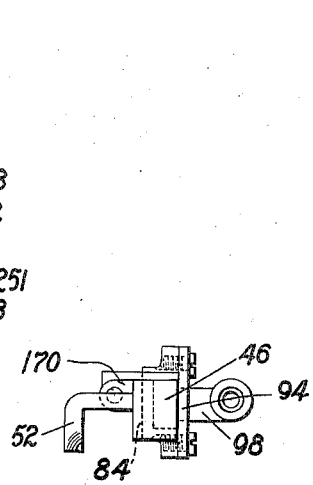
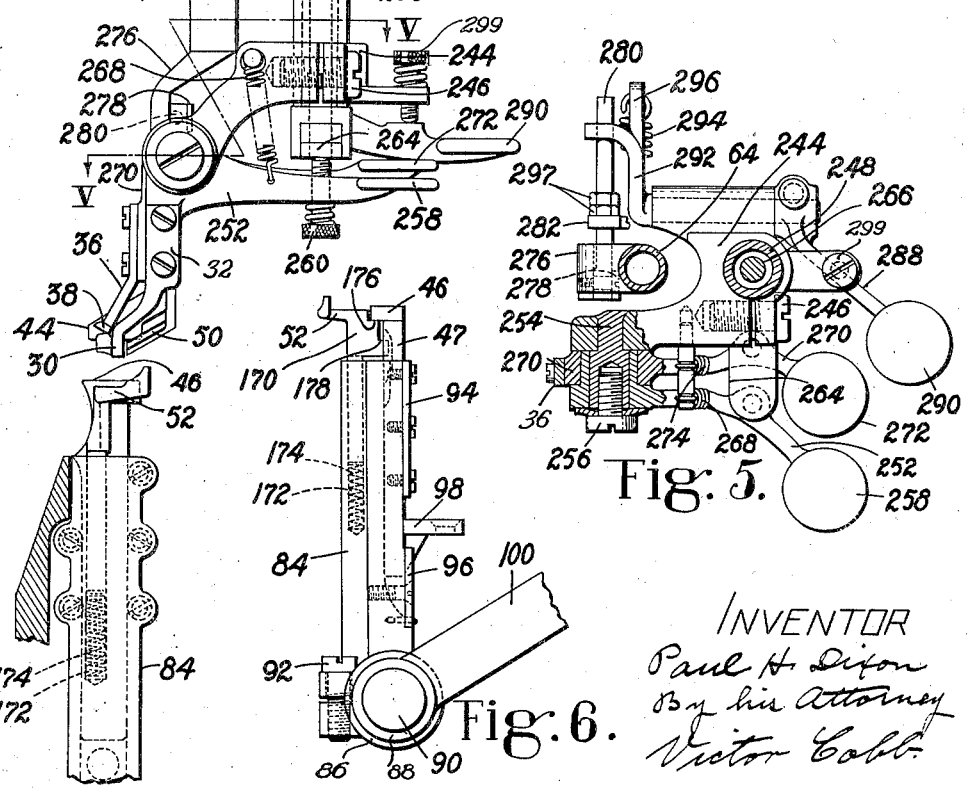

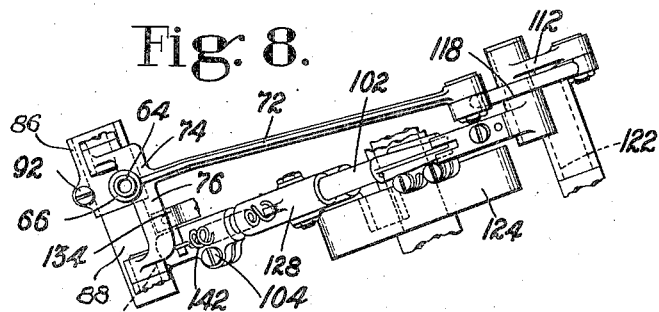
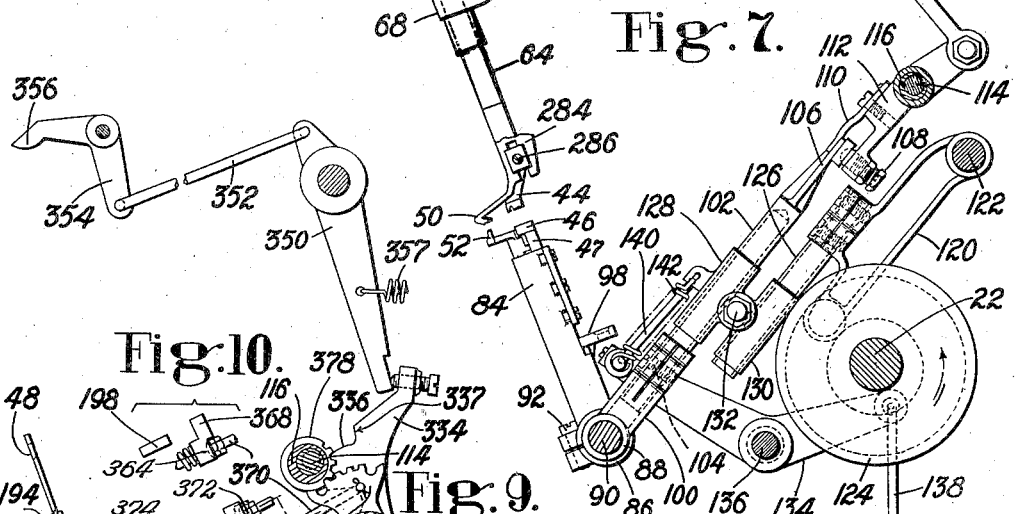
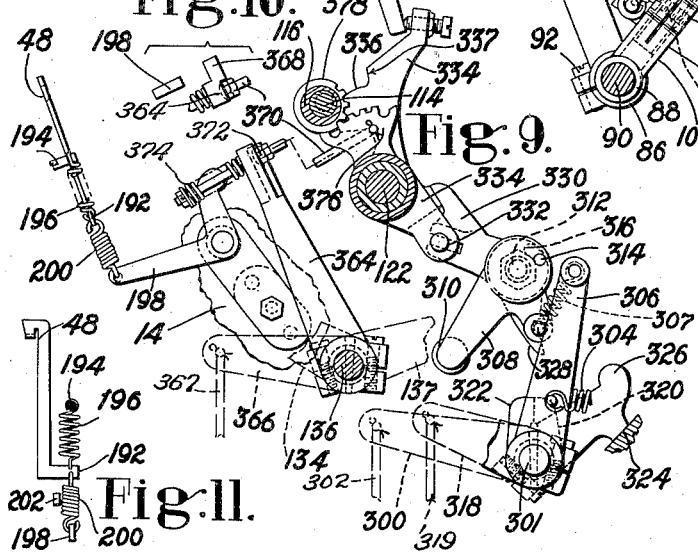

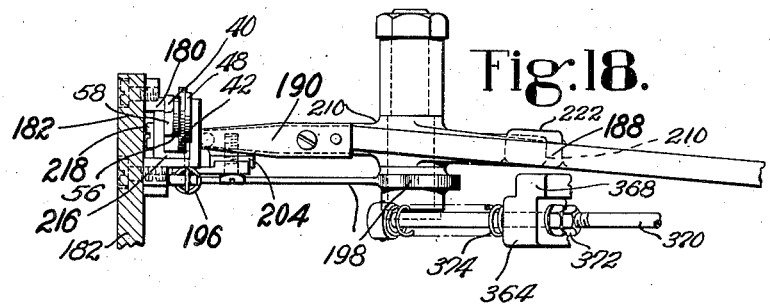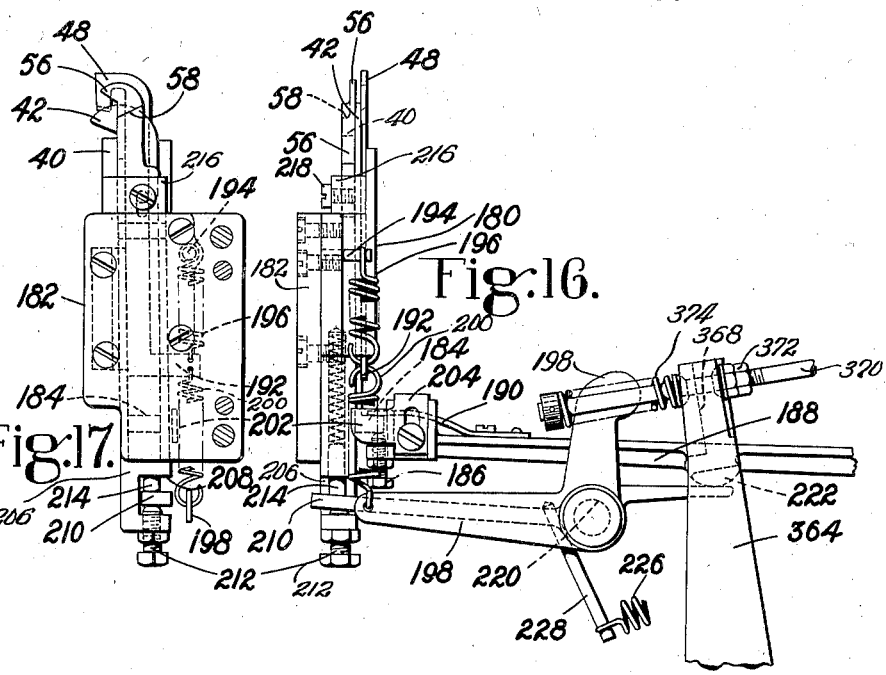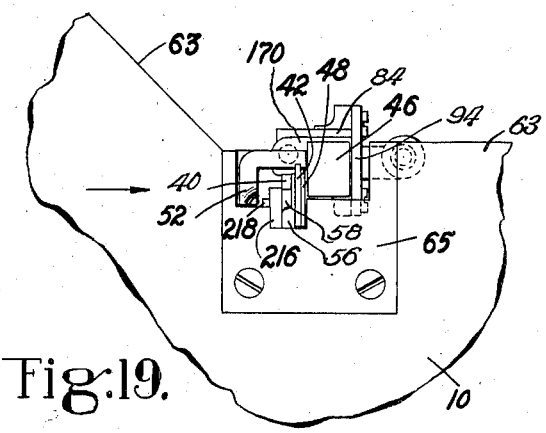

Feb. 21, 1939. P. H. DIXON 2,147,735
FOLDING MACHINE
Filed Oct. 15, 1936 7 Sheets-Sheet 7

INVENTOR
Paul H. Dixon
By his Attorney
Victor Cobb

Patented Feb. 21, 1939

2,147,735

UNITED STATES PATENT OFFICE 2,147,735

FOLDING MACHINE

Paul H. Dixon, Salem, Mass., assignor to United Shoe Machinery Corporation, Paterson, N. J., a corporation of New Jersey Application October 15, 1936, Serial No. 105,761

51 Claims. (Cl. 12—54)

This invention relates to machines for folding the margins of pieces of work, such as the uppers of shoes, and an object of the invention is to provide an improved machine of this class by means of which better work may be done on a wide variety of pieces and at such a speed that greater production will be secured as compared with machines already in use.

This machine is of a class in which the previously cemented margins of work pieces are folded over on the body of the work and pressed into position. It is equally well adapted for folding the skived margins of leather pieces and for folding shoe parts in which the margin comprises a binding, one edge of which is stitched to the work and the other edge of which is folded over on the body of the work.

Features of the invention reside in mechanism which permits the level of the cemented surface between the folded margin and the body of the work to be kept constant regardless of variations in the thickness of the work. To this end, various operating tools which contact with the finished surface of the work and lie below it in the machine are made yieldable, thereby accommodating work pieces which vary in thickness and taking care of thickened portions of the work, such as at seams, without scarring the work or varying the folding action or the width of fold.

Other features of the invention reside in improved folding instrumentalities comprising tools which act successively on the margin of the work as it is fed through the machine. These tools include a plow which is provided with an inclined upper surface and in addition is reciprocated toward and away from the under side of the work to start tilting the margin thereof, a lip turner, a lip holddown and a cooperating creaser plate and folding finger. By these tools, the margin lying originally substantially in the plane of the body of the work is turned up into an upright position and then carried over into a position almost into contact with the body of the work. From this position, it passes to the hammer which presses the margin into firm contact with the work. Facility in guiding the work is insured by the provision of a gage finger which reaches over the margin being folded and with which the edge of the work contacts after it has been turned more than ninety degrees and lies just over the creaser plate almost in contact with the body of the work.

Improvement in the uniformity of the pleats formed in going around convex corners and the firmness with which these pleats are pressed down is gained by novel hammering mechanism comprising upper and lower hammers which move toward each other yieldably into engagement with the work and then swing about centers spaced a substantial distance above and below the work to effect a feeding action which is illustrated as directly away from the operator.

These and other features of the invention will be best understood from a consideration of the following description, taken in connection with the accompanying drawings, in which Fig. 1 is a side elevation of the machine with parts broken away;

Fig. 2 is a plan view;

Fig. 3 is a front elevation with part of the frame broken away;

Fig. 4 is a detail, plan view of the work-engaging ends of the plow and the lower hammer;

Fig. 5 is a section on the line V—V of Fig. 3, looking down on the finger pieces by means of which certain tools may be thrown out of operating position;

Fig. 6 is a side elevation of the swinging carrier for the lower hammer and the plow;

Fig. 7 is a side elevation of the hammer-swinging mechanism, taken out of the machine and viewed by itself;

Fig. 8 is a plan view thereof;

Fig. 9 is a similar, side elevation of a group of treadle-operated parts which I shall term a throw-out mechanism and associated with it is a knife-operating mechanism;

Fig. 10 is a detail, plan view of a portion of this knife-operating mechanism;

Fig. 11 is a front elevation of a portion of this knife-operating mechanism;

Fig. 12 is a side elevation of a group of parts for moving the hammers toward and away from each other;

Fig. 13 is a plan view of these same parts;

Fig. 14 is a side elevation of a group of parts for operating the folding finger, the lip turner, etc.;

Fig. 15 is a plan view thereof;

Fig. 16 is a side elevation of the connection between an operating lever, shown on a smaller scale in Fig. 14, and associated parts including a folding finger, a knife, a lip holddown, a lip turner and a plunger;

Figs. 17 and 18 are a front elevation and a plan view of these same parts;

Fig. 19 is a plan view taken just above the work table and showing the work-engaging parts which are actuated from below the table;

Figure 26:
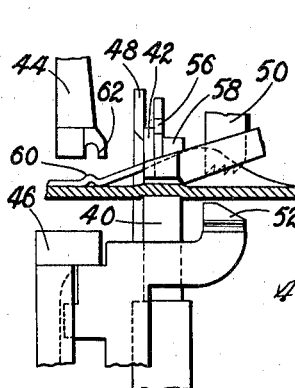
Figure 27:
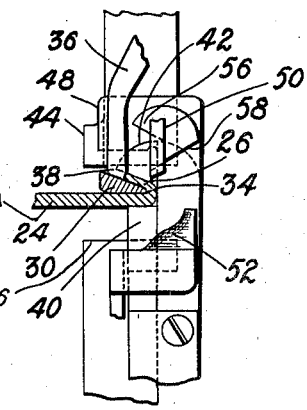
Figure 28:
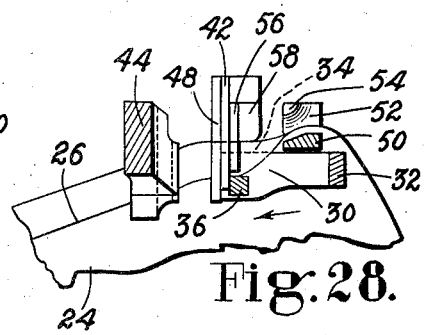

Figs. 20 to 25, inclusive, are step-by-step views illustrating the successive movements of the operating tools in folding the margin of a skived piece of leather;

Fig. 26 is a similar view illustrating the formation of a pleat;

Fig. 27 is a view of the operating tools taken at right angles to a piece of work which is shown in section gripped by the tools; and Fig. 28 is a similar view but taken from above the work and looking down on the margin which is being folded.

Figure 1:
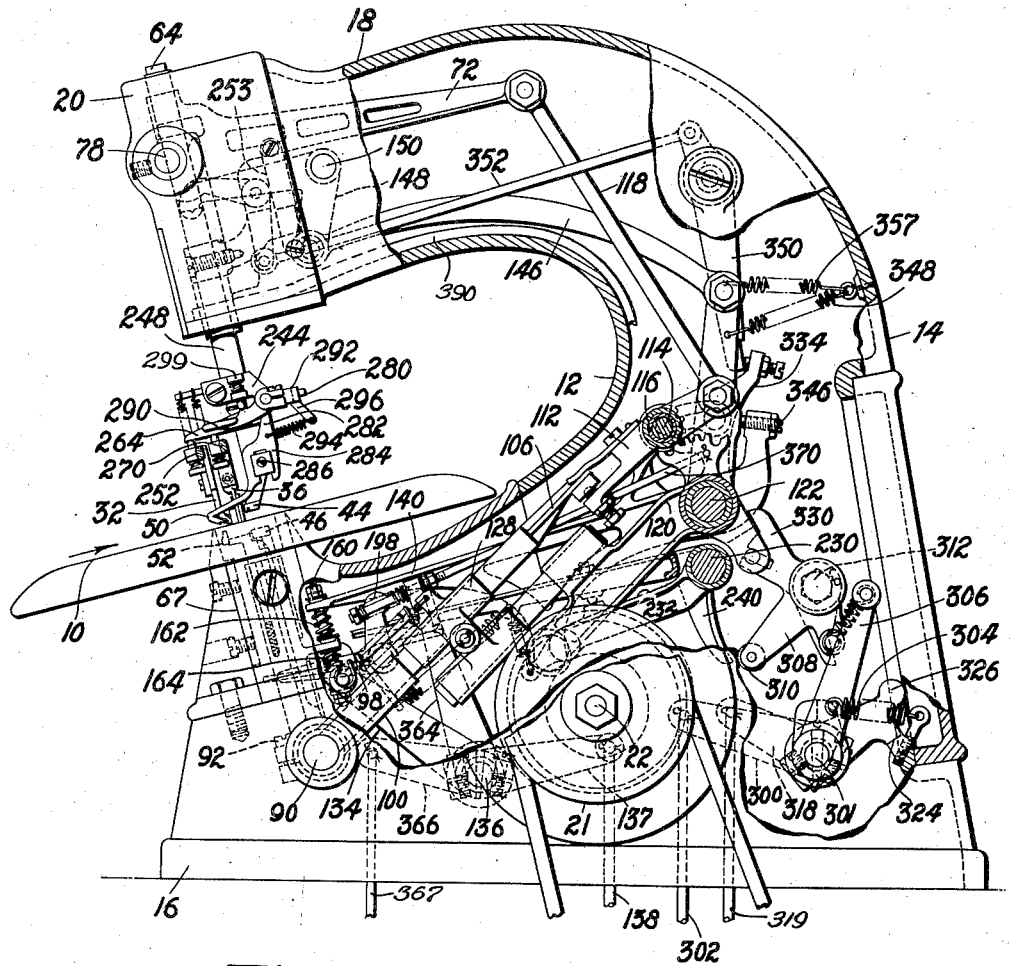
Figure 20:
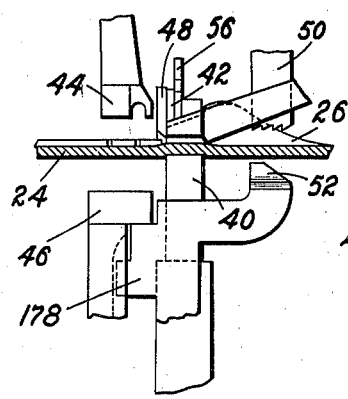
Figure 21:
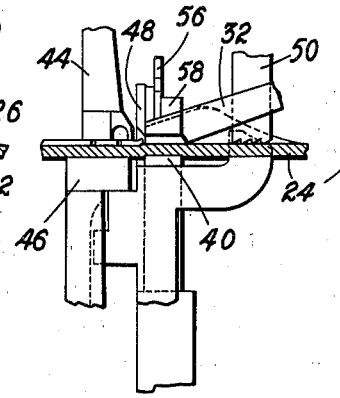
Figure 22:
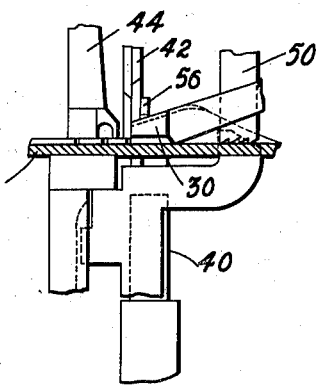
Figure 23:
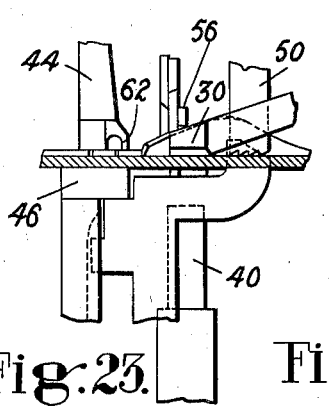

The work may be supported on a table 10 and is moved from left to right in Fig. 1, the operator sitting at the front of the machine, at the left of Fig. 1, and the work being fed away from him toward the curved portion 12 of a frame 14 having a base 16 so that it may be mounted on a bench and provided with an overhanging arm portion 18 on which there is a head 20. As is usual in folding machines, certain of the tools are mounted above the work and are operated from mechanism contained within the head 20 while other tools are beneath the work and are operated by mechanism contained within the base of the frame by means of power supplied through a pulley 21 to a cam shaft 22.

Figure 25:
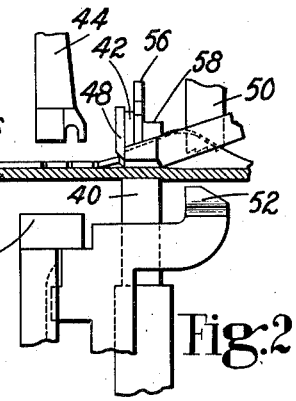

The work-engaging tools of the machine are shown on an enlarged scale in Figs. 25, 26 and 27. For facility of description, the mechanism by means of which the tools are separated or "thrown out" to facilitate admission of the work will be described later on in the specification and it will be assumed at this time that a piece of work such as a leather upper 24 having a skived margin 26 (Fig. 27), is being treated by the machine, the finished face of the work being that which rests on the table 10. During the intervals between feeding operations, the work is gripped against the upper and lower sides of a creaser plate 30. This is a thin-edged plate (Figs. 27 and 28) positioned substantially horizontally and carried at the lower end of a supporting shank 32 and, by its edge 34, determining the line of fold. A gage supported on a shank 36 has a foot 38 resting on the upper face of this creaser plate, one side of this foot 38 being engaged by the extreme edge of the work piece as it passes over the creaser plate 30.

In the position illustrated in Figs. 27 and 28, the work is gripped against the creaser plate pending the return movement of the feeding members. This gripping is effected by a plunger 40 which holds the body of the work against the under side of the creaser plate 30 and by a folder 42, the overhanging, hook-shaped upper end of which has an inclined lower surface corresponding to the inclination of the upper surface of the creaser plate 30. The arrangement is such that the folder 42 contacts with the skived margin to grip it against the creaser plate 30 slightly ahead of the time when the plunger grips the body of the work against the under side of the creaser plate. In so doing, the plunger tends to force any fullness laterally into the body of the stock away from the shank of the folder 42 and assures easy manipulation or turning of the work piece.

At that time, an upper hammer 44 having a groove 62 in its lower face and a coacting lower hammer 46 are separating and moving away from the work and rearward to a position (Fig. 20) toward the operator where the hammer is closely adjacent to a knife blade 48 used for snipping the margin on concave curves. As the operation of the machine progresses, the upper hammer 44 descends into contact with the upper side of the work and the lower hammer 46 rises into contact with the lower side of the work. Associated with these hammers are preliminary feed members comprising a feed foot 50 having a toothed lower end which engages the upper side of the work (Fig. 28) at the same time that the coacting feed member or plow 52 engages an opposite point on the under side of the work. It will be seen from Fig. 27 that this plow has a work-engaging surface which is curved upwardly toward the skived edge of the work and is also curved forwardly inwardly toward the body of the work at 54 (Fig. 28). As the curved surface 52, 54 engages the skived margin of the work, it tilts the latter upwardly, serving to positively upturn this margin preparatory to the action of folding instrumentalities, including the folder 42, in turning the edge still further in over the creaser plate 30 and the action of the hammers in completing the fold. As will appear from the later description, the preliminary feed members engage the work slightly sooner than it is engaged by the hammers and then yield to allow the hammers to come into firm engagement with the folded edge. The preliminary feed members engage the work before it reaches the folding tools to facilitate the starting of the work through these tools, especially when the work pieces have loosely attached doublers, for example. In that case, it is desirable to be able to keep the machine feeding steadily from portions which have no doubler to those portions with a doubler and this can best be done with the aid of two pairs of feeding members positioned on opposite sides of the folding instrumentalities.

Associated with the folder 42 between it and the knife 48 is a lip turner 58 secured to the plunger 40 and having a shoulder (Fig. 27) inclined upwardly and outwardly with respect to the body of the work and which, in its upward movement, supplements the action of the plow in turning the edge upwardly. Moving with the lip turner 58 is a lip holddown 56, the inclined lower face of which acts to assist the folding action by turning the margin past the ninety-degrees or upright position and toward the creaser plate 30. By this holddown 56, the work already gripped by the hammers may be released from the action of the folder 42 and of the plunger 40 but the inturned lip or margin is prevented from springing back into its original position by the coaction of the lip holddown 56 with the upper face of the creaser. It will be observed, however, that it does not grip the skived margin or lip against the creaser but merely provides a narrow space through which the margin may be dragged as the hammers and the supplemental feed members move away from the operator as he sits facing the head of the machine (Fig. 3) or at the left of Fig. 1. The work is normally supported on the table 10 but for some classes of work, such as closed vamps, it may be desirable to remove a portion of the table and this is permitted by its division along the line 63 (Fig. 19). When the table has been removed, the portion of the work being operated on will pass over a plate 65 which forms the top of a post 67.

Turning now to Figs. 7 and 8, there will be described mechanism for operating the upper and lower hammers 44 and 46 whereby they are swung around fixed pivots to feed the work in the direction of the arrows applied to Figs. 1, 2, 19 and 28. The hammer 44 is mounted on the lower end of a hollow rod 64 which is slidable in guides 66 and 68 forming part of a casting 70 having a rearwardly extending arm 72. On this same casting are curved arms 74 and 76 of unequal length, shown in front elevation in Fig. 3, by which arms the casting 70 is supported in the head 20 of the frame on fixed pivot pins 78 in bushings 80 which are held in position by screws 82. By tilting the casting 70 around these pivots 78, the upper hammer 44 is swung to impart a feeding movement to the work. The lower hammer 46 is slidably mounted in a casing 84 at the lower end of which is a split sleeve 86 by means of which this casing is clamped on a sleeve 88 supported, in turn, by a transverse pivot 90 journaled in the frame. This split sleeve 86 is held in adjusted position on the sleeve 88 by a clamp screw 92. It will be seen from Fig. 6 that the shank 47 of the hammer is slidable in a groove in the casing and is held therein by cover plates 94 and 96. On the shank 47 of the hammer is a bracket 98 by which the lower hammer is connected to an actuating lever, as shown more clearly in Figs. 1 and 12 and as later described. Extending rearwardly from the sleeve 88 is a hollow member 100 in which there is held a hollow arm 102 by means of a clamp screw 104. At its extreme end, the hollow arm 102 is reduced to form a lip 106 which is received between a set screw 108 and a leaf spring 110 supported on a lever 112 which is pivoted on a cross pivot 114 extending transversely of the frame 14, an eccentric sleeve 116 being interposed between the pin and the lever 112 for a purpose to be explained. The outer end of this lever 112 is joined to the outer end of the arm 72 on the carrier for the upper hammer by a link 118. With this arrangement, equal and opposite swinging movements are imparted to the carriers for the upper and lower hammers.

Control of the extent of the feeding movement is facilitated by a mechanism illustrated in Figs. 1, 7 and 8, by which the motion of a cam lever 120 on a fixed pivot 122 is imparted to the hollow arm 102. The cam lever 120 is swung by a track cam 124 mounted on the cam shaft 22 and, as the lever is swung, there moves with it a hollow extension 126 extending more or less parallel to the hollow arm 102 which is attached to the carrier 84 of the lower hammer 46. These arms 102 and 126 are then joined by sleeves 128 and 130 pivotally interconnected by a pin 132 and capable of movement along the arms 102 and 126 to change the effect of the movement imparted by the cam. This change in position of the interconnected sleeves is effected by a lever 134 swinging on a fixed pivot 136 in the frame and provided with a treadle rod 138 which, if pulled down, will shorten the feed. To this end, the upper part of the lever 134 is connected to the upper sleeve 128 by a rod 140 and a tension spring 142. When the treadle rod 138, which is normally held in the position shown in Fig. 7 by a treadle spring (not shown), is depressed, it slides the sleeves 128 and 130 to the right in Fig. 7, thereby shortening the effective length of the cam lever 120 and, at the same time, lengthening the distance between the pivot pin 132 and the fixed pivot 90. There is thus secured a multiplication which enables very easy control of the extent of feed. The interconnection of the end 106 of the arm 102 with the lever 112 provides a reversal of movement which enables the hammers to be swung in opposite directions about their pivots to cooperate in feeding the work.

Up-and-down movement of the hammers to cause them to grip the work or to release it, is effected by the operating mechanism shown in Figs. 12 and 13. This comprises a lower lever 141 swingable on the fixed pivot 122 by the action of a track cam 143. This cam lever 141 is connected to the lower hammer by a mechanism to be described and has an arm 144 normally rigid with the lever 141 and which is connected by a link 146 to a bell crank 148 mounted on a fixed pivot 150. The upper arm of this bell crank is forked at 152 to engage opposite sides of a grooved block 154 clamped on the hammer-carrying rod 64. The forked outer ends are curved, as shown in Fig. 12, and these curved ends are received in recesses formed in blocks 156 (Fig. 3) resting in the grooves of the block 154 and held in position by the action of a forked lever spring 158 secured to the upper side of the bell crank 148. The cam lever 141 is perforated near its lower end to receive a bolt 160 which passes through a hole in the lug 98, the bolt being surrounded with a spring 162 above the lug 98 and another spring 164 below the lug thereby insuring a yielding movement of the lower hammer 46 against the work.

This arrangement of two hammers as contrasted with the usual hammer and anvil construction provided in folding machines is highly advantageous for a number of reasons. For example, the plane in which the two adhering surfaces are brought together is maintained at a fixed level regardless of variations in the thickness of either the lip or the body of the work and any tendency to distort the folded edge is avoided. In operating on outside curves, it is customary to pleat the lip in order to take up the fullness thereof and the up-and-down movement of the upper hammer makes it easy to catch the fullness of the lip, to form a pleat. In this connection, it will be noted that the hammer is provided with a thin, hardened, steel plate adjacent to the groove 62 (Fig. 26) in the lower face of the upper hammer 44, which plate projects to the plane of the face of the hammer and, when brought into contact with the pleated work, presses the pleat into firm contact with the body of the work. The arrangement of the hammers then provides for a swinging movement which separates the forward edges of the hammer to allow the previously pleated stock to expand while the last pleat is firmly secured in position by the rear edges of the hammers as they swing to feed the work. The pressure exerted by these rear edges increases during the swinging movement because, while the action of the spring 174 is substantially constant, the area of contact with the work is reduced as the hammer faces move out of parallelism, thus increasing the pounds pressure per square inch. In this action, the thickness of the pleats already formed does not interfere with the tight gripping of the work by this rear edge of the upper hammer. The mounting of the lower hammer for up-and-down movement under the yielding action of the springs 162, 164 takes care of the greater variation in the thickness of the body of the work than will be found in the skived lip or margin. The dropping of the lower hammer as it returns toward the operator avoids any tendency to a scuffing of the finished surface of the work, such as is sometimes found when the corresponding part drags under the work.

The plow 52, provided with a shank 170 (Fig. 6), is mounted in the same casing 84 which supports the lower hammer so that the plow partakes of the same swinging movements during the work feeding as does the hammer. This shank 170 is received in a socket 172 in the casing 84 and is normally held upwardly by a spring 174. The shank 170 has an extension 176 which bears against the under side of the lower hammer 46 and is also provided with a finger 178 entering a groove in the front face of the shank 47 of the lower hammer to prevent twisting movement of the plow as it slides up and down in the casing 84. When the lower hammer is depressed, the plow will be also.

The mounting of the knife 48, the lip turner 58 and plunger 40 and the folder 42 is well illustrated in Figs. 16, 17 and 18, from which it will be seen that these parts are mounted for up-and-down, sliding movement in a guide box 180 which is supported on a plate 182 carried by the frame. In order that the folding finger 42 may be moved up and down, it is provided at its lower end with a forward extension 184 which is received between the end of an abutment screw 186 carried on a lever 188 and a leaf spring 190 secured to the top face of the latter. Lying alongside the shank of the folder 42 is the shank of the knife 48 provided, as shown in Fig. 17, with a lateral extension 192. Secured between this extension and a pin 194 is a light spring 196 (Fig. 11) which normally holds the knife in inoperative position. The extension 192 is also connected with the bell crank lever 198 (Fig. 9) by means of a stronger spring 200. The result is that when the bell crank 198 is turned by mechanism to be described, it will draw the extension 192 down into firm engagement with an arm 202 formed on a plate 204 adjustably secured by a screw in a guide groove in the side face of the lever 188. When this is done, the knife partakes of the movement of the lever 188 and moves in synchronism with the folding finger 42. Slidable in this same guide box 180 is a bar 206 having at its lower end a recess 208 to receive the end of a lever 210, this lever riding between a stop screw 212 and a spring-pressed plunger 214. The upper end of the bar 206 has a flange 216 forming a corner into which the shank of the lip holddown 56 is fitted and is held by a screw 218. This holddown and the plunger 40, which is a part of the flange 216, are designed to be moved oppositely to the folding finger and, consequently, the lever 210 is mounted on a fixed pivot 220, bears at its other end on a lip 222 on the under side of the lever 188 and is held yieldably in contact therewith by means of a coiled spring 226 extending between a pin 228 on the lever 210 and a point on the lever 188. Turning now to Figs. 14 and 15, it will be seen that the lever 188 is forked at its inner end and pivoted on a stud 230 in the frame. Between the arms of this lever is a cam lever 232 oscillated by a cam 234 and normally held in firm engagement with a stop screw 236 by a spring 238. This allows a yield of the folding finger 42 when brought into engagement with the work. The forked lever 188 has a depending arm 240 for a purpose to be later explained, this arm being integral with and directly beneath a hub 242 of the lever 188.

Certain of the tools, such as the creaser plate 30 and the gage 36, 38, which are positioned above the work, are supported in the head 20 of the machine by a mechanism best shown in Figs. 3 and 5, from which it will be seen that they are carried indirectly by a block 244 held by a pinch screw 246 on the lower end of a tube 248 slidable in the head of the machine. In order to prevent the tube 248 which carries the block 244 from rotating on its own axis, it has an offset arm 249 (Fig. 3) received between plates 251 and 253 mounted inside the head 20 and secured thereto. The creaser 30 has a shank 32 screwed to a bell crank 252 pivoted on the stud 254 riveted in the block 244. The bell crank 252 is held thereon by a screw 256 bearing against a spring washer. At the right end of this bell crank is a finger piece 258 and it is provided with an adjustable stop screw 260 abutting the lower side of a plate 264 carried on the lower end of a rod 266 slidable in the sleeve 248. The screw 260, when adjusted, controls the position of the creaser foot 30 with respect to the folding finger and in accordance with the thickness of the work. A spring 268 holds this stop screw 260 against the plate 264. Similarly, the shank 36 of the gage 38 is secured to a bell crank 270 having a finger piece 272. This bell crank is similarly provided with a stop screw which is held upwardly against the plate 264 by a spring 274. The position of the gage foot 38 laterally of the creaser plate 30 may be adjusted by turning the screw in the lever 270, thereby arranging the machine to produce different widths of the folded margin or edge portion 26 (Fig. 27). It will be noted from Fig. 5 that the hub of the bell crank 270 surrounds a sleeve extension of the hub of the bell crank 252 so that the spring washer under the screw 256 holds this bell crank 270 firmly against the side of the block 244. By this finger piece 272, it is possible to lift the gage when it would interfere with portions of the work extending beyond the edge thereof, such as are sometimes found, for example, near heavy seams. When the machine is being used to operate on closed work so that an endless fold is being formed, the operator will, adjacent to the end of the fold, depress the finger piece 258 thereby withdrawing the creaser plate 30 and allowing the completion of the fold by the machine.

It will be desired at times to lift the preliminary feed foot 50. For this a finger piece 290 is provided which is arranged as follows. The upper hammer 44 is carried on the lower end of the tube 64, a portion of which is bent at 276 (Fig. 3) to bring the hammer into the proper position relative to the other tools. On this bent portion and pivotally secured thereto by a shouldered screw 278 is a rod 280 extending forwardly therefrom. This rod passes through the upper end 282 of a carrier 284 (Fig. 1) for the preliminary feed member 50, this carrier 284 being slidable and tiltable with respect to a screw 286 on the lower portion 276 of the hammer carrier. The finger piece 290 (Fig. 5) is mounted on a lever 288 which is gripped to one end of a pivotally mounted, forwardly extending arm 292, said arm being apertured to receive the rod 280. A spring 294 (Fig. 1) extending between an arm 296 on the lever 288 and the upper end 282 of the carrier for the feed member 50 tends to hold this upper end in contact with stop nuts 297 and thereby yieldably to determine its position. The lever 288 with its finger piece 290 is also held upwardly against a stop screw 299 on the block 244 by this same spring 294. When this finger piece 290 is depressed, it rotates the arm 280 about the shouldered screw 278 and thereby lifts the feed member 50 along the pivot screw 286, away from the work.

The mechanism just described provides for throwing out the creaser plate, feed foot and gage individually, or in combination, by finger tip pressure. Foot-pedal-operated throw-out mechanism is also provided by which the operator can separate the work-gripping folding instrumentalities for rapid insertion of the work, even though the machine is running. This throw-out mechanism operates to lift the folding finger 42 above the creaser plate 30 and depress the plunger 40 from the underside of this plate and, as shown in Fig. 14, the mechanism comprises a treadle rod 302 outside the frame and connected to a lever 300 by means of which a coacting upper arm 306 may be swung to the left against the tension of a spring 304. This upper arm 306 of the bell crank 300 is connected by a spring 307 with the short arm of a bell crank 308, the arrangement being such that the spring 307 passes dead center and turns the bell crank 308 clockwise with a snap action. As the bell crank 308 throws over, a roll 310 thereon will engage the depending arm 240 on the lever 188 and will swing this lever to raise the folding finger 42 while, at the same time, lowering the lip turner 58 and the associated plunger 40. The movement imparted to the latter is not sufficient to cause the lip holddown 56 to actually touch the work. The bell crank 308 is mounted on a fixed stud 312 and its movement is limited by a pin 314 on the stud cooperating with a slot 316 in the bell crank.

In order to operate on small cut-outs satisfactorily, a second throw-out mechanism has been provided whereby the upper hammer 44 may be raised in order to extend the cut-out around the folding instrumentalities 42 and 56 (Fig. 17) and the knife 48 which all protrude from the throat plate 65 (Fig. 19), so that the work may be operated on in a flat condition. This mechanism includes a treadle-actuated lever arm 318 (Fig. 9) outside the frame (Fig. 2) and having a treadle rod 319. The arm 318 is joined to an inside lever arm 326 having a lug 320 positioned to contact with a shoulder 322 on the lever 306. Thus operation of the treadle of the second throw-out mechanism automatically effects also a preliminary operation of the first. The action of the spring 304 secured to the lever arm 306 also holds the lever arm 326 normally against a stop surface 324. The lever arm 326 has, at its right-hand end, a curved nose. This nose, when the bell crank is moved counterclockwise a substantial distance to allow the action of the first throw-out mechanism to be completed, will hit the lower arm 328 of a bell crank 330 having a pin-and-slot connection 332 with a lever 334 adapted to pivot on the shaft 122 and to throw the upper end of this lever to the left. This upper end has a cam surface 336 underlying a roller 338 (Fig. 13) on a dog 340 to lift it against the tension of a spring 342 (Fig. 12). This dog 340 is pivotally attached to the arm 144 of the lever 141 and, before the lever 334 with its cam surface 336 has been moved to the left, the dog will coact with a shoulder 344 to hold the arm 144 against a stop screw 346 on the lever 141, thus holding this arm 144 rigid with the cam lever. The arm 144 is normally drawn to the right by a spring 348 connected between it and a portion of the frame so that, after the treadle has been released, the dog 340 will drop back into place as the cam 143 rotates.

Further movement of the cam lever 334 will bring a hook 337 at the end of the cam surface 336 against the cam roll 338 (Fig. 13) and, moving the lever arm 144 against the spring 348, will raise the upper hammer 44. This counterclockwise movement of the lever 334 will also effect (Fig. 9) a swinging of the lever 350 which is connected by a rod 352 to another bell crank 354 having a curved finger-like end 356 which is arranged to throw out, i. e., to raise, the gage and the creaser plate, this action taking place before the hammer is picked up due to the hook 337 on the cam 336. The finger 356 projects through a slot (Fig. 3) in the sleeve 248 which carries the block 244 on which are supported the creaser plate and the work gage, and it overlies a plunger block 358 fitting slidably within the sleeve 248 and resting on the top of a rod 266 which carries a plate 264 located above the stop screws 260 in the finger levers 252 and 270. Thus, the downward movement of the rod 266 is effective to tilt these finger levers and to swing the creaser plate and the work gage to the left in Fig. 3, away from the work and from under the folding finger and lip holddown. The screw at the upper end of lever 334 permits adjustment of the extent to which the creaser plate may be thrown out. Surrounding the sleeve 248 and clamped to it is a collar having a nose 360. This is associated with a collar, on the hammer-carrying rod 64, which has a nose 362 facing in the other direction. There is thus a lost-motion interconnection between the hammer rod and the carrier for the creaser plate and work gage whereby a lifting of the hammer is accompanied by a delayed lifting of the block 244 carrying the creaser plate and the gage.

In order to throw the knife into operation, it has already been pointed out that the bell crank 198, shown in Fig. 9, must be swung in a counterclockwise direction. This is effected by a treadle-operated lever 364 swinging on the pivot 136 and having an arm 366 which is outside the frame and is adapted to be connected to a treadle (not shown) by a rod 367. The upper end of the lever 364 has a portion 368 (Fig. 10) with a vertical face which is positioned to engage the rounded end of the bell crank 198 (Fig. 9) when the treadle is depressed. This, as has been already described, will draw the laterally extending end portion 192 of the knife into engagement with the projection 202 on the plate attached to the lever 188 and will cause the knife to be operated at intervals in synchronism with the movement of the creaser finger. Passing through the near side of the upper end of the lever 364 is a rod 370 having stop nuts 372 held against the lever by a spring 374. The other end of the rod 370, shown as offset in Fig. 9 simply for convenience of illustration, is attached to a rack 376 pivotally mounted on a sleeve surrounding the rod 122. This rack is arranged to engage a toothed portion of a flange 378 on which there is the eccentric sleeve 116. When the knife is being operated and the rod 370 is therefore pulled to the left in Fig. 9, this eccentric sleeve moves the center for the lever 112 (Fig. 7) to cause the path of up and down movement for the upper hammer 44 to clear the knife.

When, however, the knife is not being used, then the eccentric sleeve 116 is rotated to cause the path of movement of the hammer to be closer to the forward end of the creaser plate 30 thus enabling the machine to work to best advantage on short outside curves, the hammer gripping the work closer to the gage.

The operating parts of the machine which are enclosed within the frame 14 and the overhanging arm 18, as well as the head 20, are well supplied with oil by a pump within the casing 380 (Fig. 2) and operated by a tongue-and-groove connection 382 with the cam shaft 22. The space between the swinging hammer bar 64 (Fig. 3) and its sleeve 68 and the casing of the head 20 is made oil tight by a gasket having a lower portion 384 fitting the enlarged hole in the head 20, which is necessary for this swinging sleeve 68. The gasket also has an upper portion 386 which fits tightly around the sleeve 68 and a thinner, intermediate portion 388 which will yield to accommodate the up-and-down movements and the swinging movements of the sleeve 68. In the lower portion of the casing of the head 20 there is provided a small pipe 390 by which the oil accumulating therein is siphoned back into the main portion of the hollow frame 14.

Figure 24:
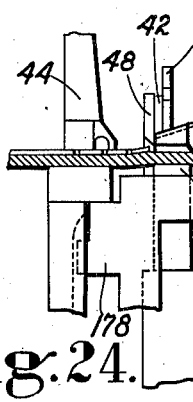

In using the machine, the operator will depress the treadle rod 302 with an ordinary piece of work or, if it is the margin of a cut-out which is to be folded, he will depress the treadle rod 319, thus separating the work-engaging parts and allowing the work to be pushed in beneath the creaser plate until the margin turns over the top thereof. The treadle rod 319 then being released, the step-by-step movement of the machine parts may be traced by observing Figs. 20 to 25. The hammers first engage the work, carrying with them the preliminary feed member 50 and the plow 52 which turn up the incoming margin. As the operation continues (Fig. 22), the work is held in the grip of the hammers while the work grippers, such as the folder 42 and the plunger 40, withdraw. The lip holddown 56, by this same movement, is separated from the upper surface of the creaser plate 30 to form a passage for the margin edge in engagement with the gage 38. As the work is thus carried through the control members, the two adhering surfaces are maintained in a fixed plane, regardless of variations in stock thickness. This results from the fact that the plane is determined by the creaser plate 30 and the further fact that the under members yield downwardly. Such an action is highly desirable in order to get a uniform width of fold. During this feeding movement, the hammers are aided by the synchronized preliminary feed members 50 and 52. At the completion of the feeding movement (Fig. 24), the hammers remain at rest and continue to grip the work while the folding finger 42 and the plunger 40 move into their gripping positions. If the knife is in operation, the treadle rod 367 attached to the arm 366 having been depressed, it will descend with the creaser finger and snip the margin of the work, passing by the extreme forward end of the creaser plate 30, as shown in Fig. 24, with which the knife cooperates to effect a shearing action. The work now being held by the folder 42 and the plunger 40, the hammers separate (Fig. 25), as do also the supplemental feed members, and return to their initial positions. If the knife is disengaged and not in use, then, on a convex curve, the folded edge 26 will be formed in pleats 60, as shown in Fig. 26, and the construction of the hammer with its grooved face 62 facilitates this operation.

Having described my invention, what I claim as new and desire to secure by Letters Patent of the United States is:

1. In a folding machine, work-feeding members, and folding instrumentalities including a plow, the work-engaging surface of which is inclined upwardly and outwardly of the work to turn up the edge to be folded, said plow being yieldingly supported for movement heightwise of the work.

2. In a folding machine, work-feeding members, and folding instrumentalities including a plow, the work-engaging surface of which is inclined upwardly and away from the body of the work to turn up the edge to be folded and means for imparting an up-and-down movement to said plow.

3. In a folding machine, work-feeding mechanism including a feed foot which engages one surface of the work, said machine being provided with a plow having a work-margin-engaging surface inclined upwardly and away from the body of the work, said plow being movable heightwise of the work into engagement with the margin of the other side of the work to turn it toward the feed foot, and means for moving the plow heightwise.

4. In a folding machine, a foot having an end surface inclined to the horizontal and engaging the upper surface of the work, a plow having an end surface adjacent to said foot surface inclined to the horizontal and engaging the lower surface of the work opposite to said foot and cooperating with the foot to grip the work and to tilt upwardly the margin to be folded, and means to move the plow up and down to tilt the margin and grip the body of the work against said foot.

5. In a folding machine, work-feeding mechanism comprising a feed foot in engagement with one surface of the work, said machine being provided with a plow having an inclined work-margin-engaging surface and arranged for upward movement into engagement with the under surface of the work opposite the feed foot, said plow being also mounted for work-feeding movement in cooperation with the feed foot.

6. In a folding machine, an upper hammer movable into and out of engagement with the work, and folding instrumentalities including a movably mounted plow for initiating the fold and a movably mounted lower hammer cooperating with the upper hammer to complete the fold, said plow and cooperating lower hammer being mounted for upward movement into engagement with the lower surface of the work.

7. In a folding machine, work-folding instrumentalities comprising a plow movable toward and away from the finished face of the work and a movably mounted hammer for engagement with the finished face of the body of the work, said plow and said hammer being arranged for movement together from a position separated from the work to a position contacting with the work.

8. In a folding machine, folding instrumentalities comprising a plow mounted for movement toward and away from the under surface of the work and a hammer movable toward and away from the same surface of the work, and a feeding member for engagement with the other surface of the work, said plow and hammer being also mounted for movement with the work to assist said feeding movement.

9. In a folding machine, folding instrumentalities including a plow and a hammer movable toward and away from the surface of the work, said plow and said hammer being interconnected, and means for retracting the hammer and thereby the plow.

10. In a folding machine, an interconnected plow and hammer movable toward and away from the surface of the work, said plow being mounted for yielding movement independently of the hammer.

11. In a folding machine, folding instrumentalities, and work-feeding mechanism comprising a swinging carrier, said machine having a plow and a hammer for engagement with the same surface of the work and mounted in said carrier for movement toward and away from the work.

12. In a folding machine, work-margin-folding means comprising a plow for initiating the fold and a hammer for assisting in the completion of the fold, said plow and hammer being mounted for movement toward and away from the work, a swinging carrier in which said plow and hammer are mounted, means for swinging said carrier, and means for moving said hammer in the carrier.

13. In a folding machine, folding instrumentalities, a hammer for pressing the fold, said hammer being also mounted for work-feeding movement, and a preliminary feed member engageable with the work before it reaches the folding instrumentalities, said preliminary feed member being carried by said hammer.

14. In a folding machine, folding instrumentalities, a hammer mounted above the work for pressing the fold and arranged also for work-feeding movement, a preliminary feeding member carried by the hammer and extending past the folding instrumentalities to engage the upper surface of the work at the rear of said instrumentalities, said preliminary feed member being mounted for movement toward and away from the work and for work-feeding movement with the work, and cooperating work-feeding members engageable with the other surface of the work in opposition to said hammer and said preliminary feed member.

15. In a folding machine, folding instrumentalities, and work-feeding mechanism comprising a combined feed member and plow engageable with the work at the rear of said folding instrumentalities, said member being mounted for movement toward and away from the work and for feeding movement with the work during each cycle of the machine.

16. In a folding machine, folding instrumentalities, and work-feeding mechanism comprising a principal feeding member and a preliminary feeding member carried by said principal member, said preliminary member being mounted to come into contact with the surface of the work prior to engagement thereof by the principal feeding member.

17. In a folding machine, work-feeding mechanism, folding instrumentalities comprising a plow for turning the margin upright, a creaser plate over which the margin of the work may be folded and a folding finger for bending said margin over the creaser plate and having a shank close to the edge of said plate and a hook-shaped upper end, and means for drawing said hook-shaped end down against the upright margin to bend it over the creaser plate.

18. In a folding machine, work-feeding mechanism, and folding instrumentalities comprising a creaser plate over which the margin of the work may be folded and a folding finger for bending said margin over the creaser plate, said finger having a hook-shaped upper end and being mounted for straight-line movement toward and away from the work.

19. In a folding machine, work-feeding instrumentalities, a plow for initiating the upturn of the margin to be folded, and a lip turner beyond the plow mounted for straight-line movement toward and away from the under face of the margin of the work, said lip turner being provided with a surface inclined upwardly and outwardly with respect to the body of the work for engagement with the margin to be folded.

20. In a folding machine, work-feeding mechanism, and folding instrumentalities arranged for successive engagement with the work as it progresses through the machine and comprising a plow, a lip turner movable into engagement with the under face of the margin to tilt it up and a folding finger for turning over the tilted margin substantially into engagement with the body of the work.

21. In a folding machine, work-feeding mechanism, and folding instrumentalities comprising a plow positioned beneath the work and movable both upwardly to lift the margin of the work and forwardly as it cooperates with the feeding mechanism and a folding finger the effective surface of which is above the work and which is arranged to bend the upturned margin substantially into engagement with the body of the work.

22. In a folding machine, work-feeding mechanism, and folding instrumentalities comprising a lip turner for tilting up the margin of the work, a lip holddown for bending the margin past a position in which it is at ninety degrees to the body of the work, a folding finger which still further turns the margin substantially into engagement with the body of the work, and a hammer for pressing the folded margin against the work.

23. In a folding machine, work-feeding mechanism, a gage, and folding instrumentalities including a lip holddown held against movement in the direction of feeding movement and cooperating with the partly folded margin of the work, said lip holddown being constructed and arranged to retain that margin in normal relationship with the gage as the work is being fed.

24. In a folding machine, work-feeding mechanism, a creaser plate, a gage, and a folding member cooperating with and normally overlying the creaser plate and movable toward and away therefrom, said member in its separated position forming a passage between itself and the creaser plate for receiving the marginal edge of the work to control it during the feeding movement.

25. In a folding machine, work-feeding mechanism, and folding instrumentalities comprising a creaser plate inclined to the horizontal over the upper surface of which the margin of the work is turned, a gage overhanging the upper surface of the creaser plate, for engagement with the edge of the margin of the work as it lies on the creaser plate, and a movable folding member the lower surface of which cooperates with said gage and creaser plate to form a restricted passage higher than the margin is thick for controlling the margin operated on as the work is fed.

26. In a folding machine, work-feeding mechanism, and folding instrumentalities comprising means for initiating the fold and means for completing the fold together with an intermediate member reciprocating in a path closely adjacent to the line of fold, said member having an inclined surface for tilting the margin upwardly and another inclined surface for tilting the margin downwardly.

27. In a folding machine, work-feeding mechanism, a creaser plate, a plunger for gripping the work against the under side of the creaser plate, a lip turner secured to the plunger for tilting up the margin of the work, and means for pressing the tilted margin against the upper surface of the creaser plate.

28. In a folding machine, work-feeding mechanism, and folding instrumentalities comprising a creaser plate, a folding finger having an inclined surface movable down to press the margin to be folded against the creaser plate and a lip holddown cooperating with and overlying the creaser plate and having a surface inclined at a steeper angle than the work-engaging surface of the folding finger.

29. In a folding machine, work-feeding mechanism, folding instrumentalities including a creaser plate and means for turning the margin of the work over said creaser plate, a lip holddown having a margin-engaging surface positioned above said creaser plate, and means for moving said holddown to a position separated from the creaser plate when the work is being fed.

30. In a folding machine, work-feeding mechanism, and folding instrumentalities comprising a plunger for gripping the body of the work and a lip holddown movable with said plunger for tilting the margin of the work when the plunger releases the work.

31. In a folding machine, work-feeding mechanism, folding instrumentalities including a creaser plate over which the margin of the work is folded, and a knife for snipping said folded margin reciprocable along a path closely adjacent to the creaser plate and cooperating therewith to effect a shearing cut of the margin supported on the creaser plate.

32. In a folding machine, means for turning the margin of the work from a position substantially in the plane of the work through substantially one hundred and eighty degrees to bring it into contact with the body of the work, means for snipping the margin, and means for operating said snipping means after the margin has been turned substantially more than ninety degrees.

33. In a folding machine, work-feeding mechanism, folding instrumentalities operating on the margin of the work to fold it as it is drawn along by the feeding mechanism, a hammer for pressing the fold, and means positioned just behind the hammer for snipping the work after it has been fed through the folding instrumentalities.

34. In a folding machine, means for snipping the margin of the work to be folded comprising a knife mounted for reciprocation, a light spring urging said knife away from the work, and folding instrumentalities comprising a member for intermittently gripping the work, means for operating said gripping member and knife-operating means including a spring for drawing a portion of said knife into contact with said gripper-operating means whereby the knife cuts the margin when it is gripped.

35. In a folding machine, work-feeding mechanism including a feeding member movable toward and away from the work and with the work, a snipping knife rearwardly of said feeding member, an operator-controlled member for rendering said snipping knife operative and means actuated by movement of said operator-controlled member for varying the rear terminus of the path of feeding movement of said feeding member.

36. In a folding machine, folding instrumentalities, and work-feeding mechanism including a hammer movable into engagement with the work forward of said instrumentalities, a snipping knife, an operator-controlled member causing reciprocation of said knife and means rendered operative by movement of said operator-controlled member for changing the path of movement of the hammer to move said path farther away from the folding instrumentalities thereby to give room for movement of said knife.

37. In a folding machine, work-feeding mechanism, and folding instrumentalities including a creaser plate over which the margin of the work is folded and a gage cooperating with the edge of the work, said gage resting on said creaser plate.

38. In a folding machine, work-feeding mechanism, means for folding the margin of the work over the body of the work, and a gage supported laterally of the path of movement of the work extending over the already folded margin into contact with the edge of the work as it lies above the body of the work.

39. In a folding machine, work-feeding mechanism, means for progressively turning the margin from a position substantially in a plane with the body of the work through one hundred and eighty degrees to a position where it lies over the body of the work, and a gage cooperating with the edge of the folded margin of the work to guide it after said margin has been turned through more than ninety degrees and hence lies above the body of the work.

40. In a folding machine, means for feeding the work along a predetermined path, means for folding the margin of the work, and means for determining the width of the fold comprising a creaser plate against the upper surface of which the folded margin is pressed, a gage finger cooperating with the upper surface of the creaser plate to contact with the edge of the folded margin and means for adjustably determining the position of said gage.

41. In a folding machine, means for feeding the work along a path, a creaser plate overlying the body of the work and against the upper surface of which the margin of the work is folded, a pivot the axis of which is substantially parallel to the path of feeding movement, a gage arm mounted on said pivot and extending transversely of said path, said gage arm terminating in a gage finger touching the upper surface of the creaser plate and against which the edge of the folded margin is guided, and a screw associated with said pivoted arm by the adjustment of which the position of the gage finger may be varied.

42. In a folding machine, a frame including an overhanging hollow head, a hammer, a hammer bar carried thereby which is slidable through said head and movable laterally with respect to the head to feed the work, a guide for said bar, and a resilient gasket between said head and said guide.

43. In a folding machine, a frame including an overhanging hollow head, folding and feeding means part of which are mounted in said head and part of which are mounted in the body of the frame beneath the work, said feeding means including a hammer, a guide in which said hammer slides toward and away from the work, said guide being mounted for lateral movement with respect to said head along the line of feed, and means for preventing oil leakage around said hammer guide comprising a resilient gasket having a portion closely engaging said hammer guide, another portion closely engaging said head and an interconnecting resilient wall.

44. In a folding machine, folding instrumentalities, means for completing the fold comprising a hammer mounted beneath the work for movement toward and away from the body of the work under that portion with which the previously folded margin of the work is contacting, and feeding mechanism for carrying the work through the machine.

45. In a folding machine, folding instrumentalities, and feeding mechanism including a yieldable hammer mounted beneath the body of the work for movement toward and away from the work into engagement with the body of the work at a point beneath the already folded margin and for forward movement with the work.

46. In a folding machine, folding instrumentalities, cooperating upper and lower hammers, swingably mounted guides for said hammers, and means for reciprocating both of said hammers to cause them to grip the work and for swinging said guides to cause the hammers to feed the work.

47. In a folding machine, folding instrumentalities, cooperating upper and lower hammers, one of which is spring pressed into engagement with the work, means for reciprocating said hammers transversely of the thickness of the work to cause the substantially parallel faces thereof to grip the work, and means for imparting a feeding movement to said hammers constructed and arranged to rock the hammer faces out of parallelism during the feeding movement whereby the newly engaged portion of the fold is pressed even more firmly than is the reengaged portion during the feeding movement.

48. In a folding machine, work-feeding mechanism, and folding instrumentalities including a creaser plate over one surface of which the margin of the work is bent, said creaser plate being movably mounted, a movably mounted gage cooperating with said surface of the creaser plate and the edge of the partly folded margin of the work thereon, and operator-controlled means for moving said creaser plate and said gage away from the body of the work.

49. In a folding machine, work-feeding mechanism, folding mechanism including a creaser plate and cooperating upper and lower members for gripping the margin of the work and the body of the work against the creaser plate, and operator-controlled mechanism for throwing said cooperating members out of engagement with the work.

50. In a folding machine, work-feeding mechanism, folding instrumentalities including a creaser plate over which the margin of the work is bent, a folding finger for bending the margin of the work over said plate and gripping it against the plate, a plunger for gripping the body of the work against the under surface of the plate, and operator-controlled mechanism for throwing said work grippers out of engagement with the work at the will of the operator.

51. In a folding machine, work-feeding mechanism including a hammer engaging the upper surface of the work, folding instrumentalities including a work-gripping member engaging the under surface of the body of the work, and operator-controlled mechanism for lifting said hammer away from the work and throwing said gripper out of engagement with the work.

PAUL H. DIXON.